United States Patent [19]

Li et al.

[11] Patent Number: 5,274,364
[45] Date of Patent: Dec. 28, 1993

[54] WINDOW CLIPPING METHOD AND DEVICE

[75] Inventors: Hsun-Feng Li, Taipei; Chih-Yuan Liu; Ting-Shi Wey, both of Hsin; Wei-Hsin Tzang, Taipei, all of Taiwan

[73] Assignee: Industrial Technology Research Institute, Hsin, Taiwan

[21] Appl. No.: 836,154

[22] Filed: Feb. 13, 1992

Related U.S. Application Data

[63] Continuation of Ser. No. 294,837, Jan. 9, 1989, abandoned.

[51] Int. Cl.⁵ .......................... G09G 1/10; G09G 1/16
[52] U.S. Cl. ..................................... 345/118; 345/191
[58] Field of Search ............... 340/721, 723, 724, 747, 340/750, 799, 703, 734, 745; 395/134, 135, 157

[56] References Cited

U.S. PATENT DOCUMENTS

| | | | |
|---|---|---|---|
| 4,408,200 | 10/1983 | Bradley | 340/750 |
| 4,531,120 | 7/1985 | Brownell, Jr. et al. | 340/731 |
| 4,622,546 | 11/1986 | Sfarti et al. | 340/747 |
| 4,623,880 | 11/1986 | Bresenham et al. | 340/747 |
| 4,646,076 | 2/1987 | Wiedenman et al. | 340/747 |
| 4,710,767 | 12/1987 | Sciacero et al. | 340/799 |
| 4,736,200 | 5/1988 | Ounuma | 340/734 |
| 4,745,575 | 5/1988 | Hawes | 340/744 |
| 4,837,564 | 6/1989 | Ogawa et al. | 340/748 |
| 4,868,765 | 9/1989 | Diefendorff | 340/723 |
| 4,868,781 | 9/1989 | Kimura et al. | 340/747 |
| 4,882,683 | 11/1989 | Rupp et al. | 340/723 |
| 4,885,699 | 12/1989 | Taoda et al. | 364/518 |
| 4,937,761 | 6/1990 | Hassett | 395/134 |
| 4,943,801 | 7/1990 | Oguchi | 340/747 |
| 4,947,158 | 8/1990 | Kanno | 340/747 |
| 4,979,130 | 12/1990 | Li et al. | 395/135 |
| 5,003,496 | 3/1991 | Hunt, Jr. et al. | 340/703 |

OTHER PUBLICATIONS

TMS34010 Users Guide; Texas Instruments 1986, SPVU001, pp. 7-4 to 7-18, 7-27, and 11-7.

*Primary Examiner*—Alvin E. Oberley
*Assistant Examiner*—Steve Saras
*Attorney, Agent, or Firm*—Darby & Darby

[57] ABSTRACT

A window clipping method and device for processing data with arbitrarily shaped clipping windows, wherein arbitrarily shaped clipping windows and graphic data are stored in separate bit mapped memories, employing a graphic processor and a controller. The drawing graph is drawn only inside the clipping window, and patterns of the clipping window can also be mixed with the graph. Intersection calculations of the drawing graph and the boundary of the clipping window are not employed.

7 Claims, 8 Drawing Sheets

Bit-mapped memory 9

Bit-mapped memory 10

WINDOW CLIPPING METHOD AND DEVICE

This is a continuation of application Ser. No. 07/294,837, filed Jan. 9, 1989, now abandoned.

FIELD OF THE INVENTION

This invention relates to a method and apparatus for the clipping of display data, to enable the display thereof in one or more clipping windows.

BACKGROUND OF THE INVENTION

Traditionally, clipping techniques employ a rectangular window to clip the points, lines and character strings, so that the points, lines and character strings inside the window are shown in the window, and of course, those parts outside the window are not shown. Prior art arrangements are disclosed, for example, in U.S. Pat. No. 4,623,880 and on pages 145 to 153 of "Fundamentals of Interactive Computer Graphics," published by Addison-Wesley Publishing Co. in 1982 and written by Foley & Van Damm.

In the analysis of a point, in the discussion of the above article, a point will be displayed only if it meets the inequalities:

$Xmin \leq X \leq Xmax$ $Ymin \leq Y \leq Ymax$ where (X,Y) is the coordinate of the point, Xmin and Xmax are the X-coordinate boundaries of the window, and Ymin and Ymax are the Y-coordinate boundaries of the window.

Considering the analysis of lines, in the above article, it is always necessary to perform intersection calculations between lines and every boundary of the clipping window. According to the "Cohen-Sutherland clipping" algorithm, one must divide the surrounded areas of the clipping window into eight sections and then identify those lines that can be trivially accepted or rejected by using region checks. One can easily eliminate the intersection calculations for those lines which satisfy one specific condition, but intersection calculations must still be performed with respect to the other lines. U.S. Pat. No. 4,623,880 discloses a technique to eliminate some intersection calculations for those lines having one endpoint in the window and the other endpoint outside the window. If a line crosses the window and both of its endpoints are outside the window, however, this technique still requires performing the intersection calculations, especially if the graph is very complicated. Such calculations, and the drawing of the lines, is very time consuming. Moreover, the algorithm cannot be used if the clipping window is not rectangular.

With respect to character strings, in accordance with the above article, if the character string is composed of many lines, the character must be treated as if it were a series of lines. If, however, the string is composed of bit-mapped data, a box may be built up to contain each word or the whole string. During clipping, it is only necessary to judge the relationship between the box and the window. If the box is not totally in the clipping window, the complete box (i.e. the word or the character string) will not appear. While the execution speed is increased by this technique, the technique provides incomplete results since some parts of the character string, which are actually within the window, will not be shown.

SUMMARY OF THE INVENTION

The main object of the present invention is to provide a fast and efficient method and device for the disposition of the data in arbitrarily shaped clipping windows. The invention is also directed to the provision of a method and device for overcoming the above-mentioned disadvantages with respect to incompleteness of the disposition of data and the use of complex arithmetic.

Briefly stated the invention employs one bit-mapped memory to store an arbitrarily shaped window or windows, and then fills the bits representing the interior of the window to distinguish the interior of the window from its exterior. By using READ-MODIFY-WRITE commands, the invention draws the point, line and character string and stores them in a second bit-mapped memory. During the process of drawing, the method of the invention uses a clipping-controller to perform logic processes on the bit-mapped data which contain information related to the clipping window and the drawing graph. As a consequence the method and system of the invention need not calculate the intersections between the drawing graph and the boundaries of the clipping window in order to pick out the segments of the drawing graph that are outside the clipping window.

Another object of the present invention is to overcome the limitation of prior art technology that permits only the use of rectangular window. The present invention provides a window clipping method and device for disposition of graphic data into one or more arbitrarily shaped clipping windows.

The invention preferably employs a graphic processor for storing window data in a first bit-mapped memory and for then completely filling the bits corresponding to the interior of the window with 1's or 0's to distinguish the inner and outer region of the window. The method of the invention then employs the graphic processor to execute a WRITE operation to store graphic data in a second bit-mapped memory. The two bit-mapped memories are then subjected to a READ operation by the graphic processor, with the data bus of the graphic processor floating, and the graphic processor thereby reads every data bit in a high logic level (or in a low logic level in dependence upon the use of pull-up or pull-down resistors connected to the data bus), and the real data output from the two bit mapped memories is stored in a register.

The graphic processor complements the data to be drawn and does not change those data that are not to be drawn unchanged. The graphic processor then performs a WRITE operation to the two bit-mapped memories.

The invention employs a clipping controller comprised of logic circuits to receive data bits from the graphic processor and stored in the register and then specified logic functions are performed to modify each data bit. The drawn graph is then drawn only inside the clipping window. The patterns in the clipping window can be mixed with the drawing graph. The necessity of using intersection calculations between the drawing graph and the boundary of clipping window is completely obviated by the method and system of the invention, to thus enhance the speed for clipping the data and drawing it in an arbitrarily shaped clipping window.

BRIEF DESCRIPTION OF THE DRAWINGS

In order that the invention may be more clearly understood, it will now be disclosed in greater detail with reference to the accompanying drawings, wherein.

DESCRIPTION OF THE PREFERRED EMBODIMENTS

Figure 1A:
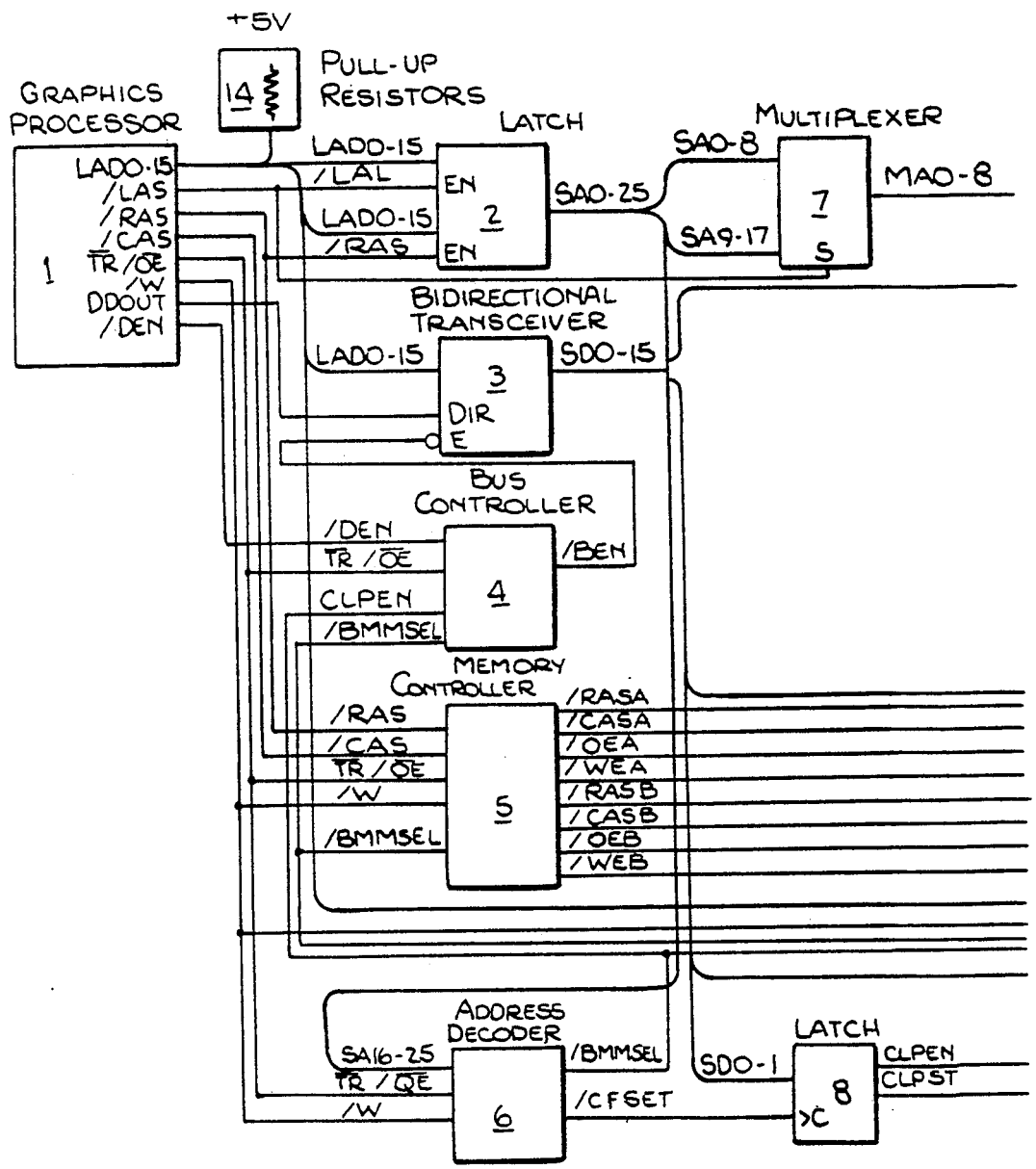
FIGS. 1a and 1b are a block diagram of hardware of a system in accordance with one embodiment of the invention.
Figure 1B:
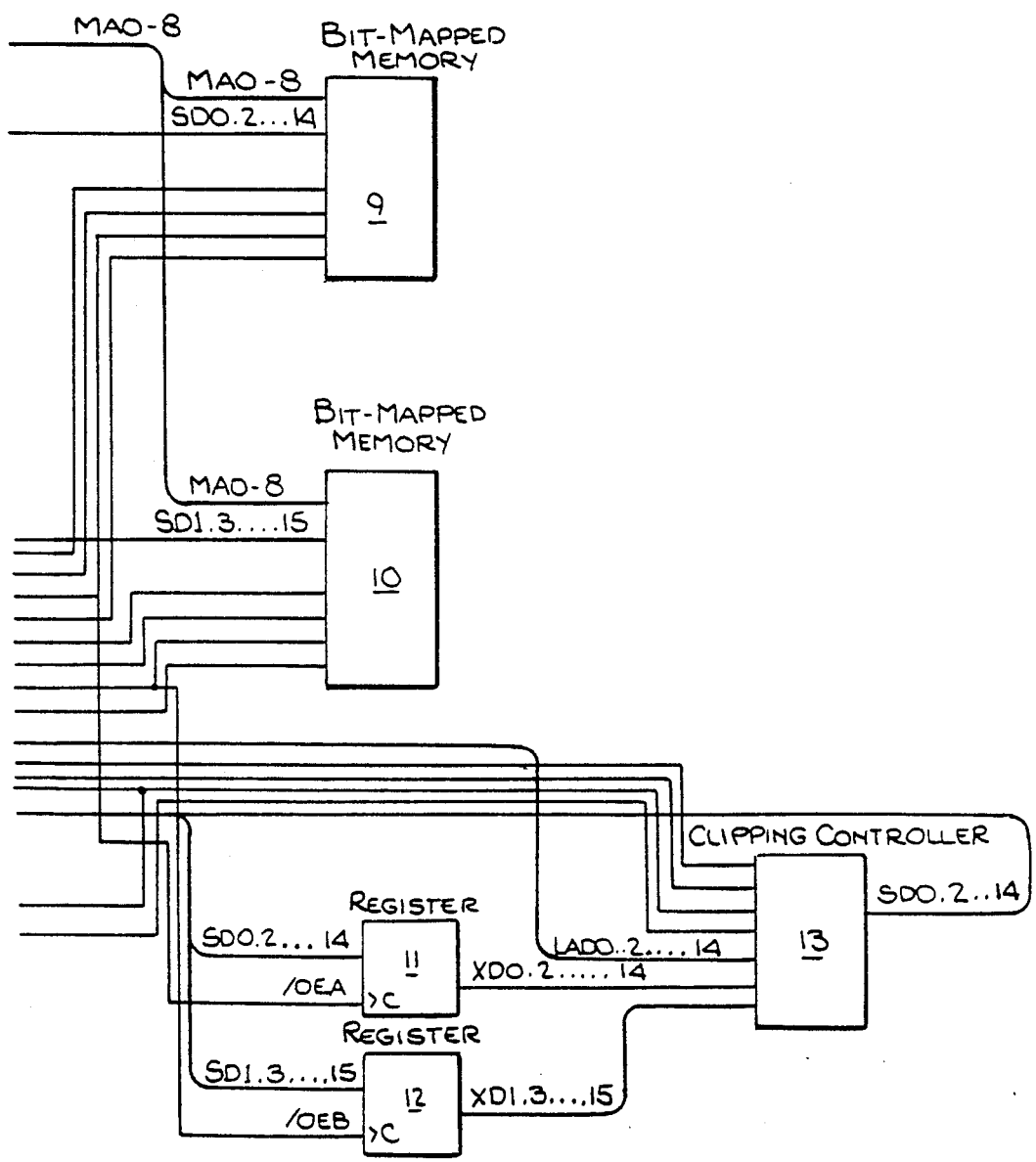

FIGS. 1a and 1b are a block diagram of a preferred system in accordance with the invention. The circuit is comprised of graphic processor 1, which may be a commercially available integrated circuit, for controlling READ-MODIFY-WRITE activity and data transfer for the bit-mapped memories 9, 10, latch 8, register 11, 12 and clipping controller 13, via bidirectional transceiver 3. In this embodiment of the invention, the graphic processor 1 may be a type TMS 34010 GSP, produced by the Texas Instruments Co. having a 32-bit internal structure and a 16-bit external data bus, forming each pixel in two bits. This integrated circuit is described in "TMS 34010 USER GUIDE" published by Texas Instruments Inc., 1986.

In order to simplify the drawing, only a few of the connection lines to the graphic processor 1 are illustrated. The connection lines shown include the 16-bit multiplexed address/data bus LAD0-LAD15. The system of the invention utilizes latch 2 and bidirectional transceiver 3 to select the address bus SA0-SA25 and data bus SD0-SD15. A row address strobe, /RAS, is used to drive the /RAS inputs of memories. A column address strobe, /CAS, is used to drive the /CAS inputs of memories. A local address latched signal /LAL, is used to capture the column address from the LAD0-LAD15 pins when the LAL signal of the memory is changed from high-level to low-level. A write strobe, /W, is used to drive the /W inputs of the memories. A shift register transfer or output enable signal, /TR/QE, is used to drive the /TR/QE inputs of VRAMS or /QE inputs of DRAMS. A data enable signal, /DEN, is used to control the active-low output-enable input of bidirectional transceiver 3. A data direction out signal, /DDOUT, is used to control the transfer direction of bidirectional transceiver 3.

Bus controller 4 controls the output-enable pin of the bidirectional transceiver 3. When CLPEN is inactive (low), the output-enable pin of the bidirectional transceiver 3 is controlled by /DEN from the graphic processor 1. When CLPEN is active (high), the output-enable pin of the bidirectional transceiver 3 is disabled, and in this event LAD0,2,4 . . . 14 are applied to the clipping controller 13 and the data processed by the clipping controller 13 is stored in bit mapped memory 9 when graphic processor 1 executes a WRITE operation, because the pull-up resistors 14 are connected to each line of the data bus so that the graphic processor 1 will read all data bits as having a high level when it executes a READ operation. With respect to memory controller 5, the signals /RAS, /CAS, /TR/QE, /W output from graphic processor 1 are classified into two groups: /RASA, /CASA, /0EA, /WA for controlling READ/WRITE operations in bit mapped memory 9 and /RASB, /CASB, /OEB, /WB for controlling READ/WRITE operations in bit mapped memory 10. Therefore the bit mapped memories 9 and 10 can be independently controlled during READ/WRITE operations.

Address decoder 6 generates a bit-mapped memory select signal, /BMMSEL, which is used to indicate that the graphic processor 1 is accessing bit mapped memory 9 and 10; a clipping function setting signal, /CFSET, which can latch the data bits SD0 and SD1 from bidirectional transceiver 3 in latch 8 and generate a clipping enable signal, CLPEN, of the same polarity as SD0, and a clipping status signal, CLPST, of the same polarity as SD1, which can be used to control the operation of clipping controller 13.

SA0-SA17 of the data bus are inputs of multiplexer 7. When /LAL is at a high logic level, SA9-SA17 are selected as outputs and applied to the address inputs of bit mapped memory 9 and 10. When this signal is at a low logic level, SA0-SA8 are selected as outputs and applied to the address inputs of bit mapped memory 9 and 10.

When graphic processor 1 executes a READ operation to the bit mapped memories 9 and 10, register 11 stores the data bits, SD0, SD2, . . . SD14 from bit mapped memory 9; register 12 saves the data bits, SD1, SD3 . . . SD15 from bit mapped memory 10; and their outputs are XD0, XD2, . . . XD14 and XD1, XD3, . . . XD15 respectively.

Clipping controller 13 is a programmable array logic (PAL). The illustrated embodiment employs a PAL20L8 programmable array logic chip, developed by MMI Co., for this circuit. When graphic processor 1 executes a WRITE operation after a clipping enable signal, CLPEN, is activated, clipping controller 13 controls the bit mapped memory 9 to assume a negative-logic state (i.e. active low), and bit mapped memory 10 to assume a positive state (i.e. active high):

If the data bit LADi, wherein $i = 0, 2, 4, \ldots 14$, on the data bus is 0 (or 1, when bit mapped memory 9 is in positive-logic):

| THEN | | |
|---|---|---|
| | If the Clipping state signal CLPST is 0 | |
| | THEN | |
| | $SDi = XDi \text{ OR } (XDi + 1);$ | |
| | $i = 0, 2, \ldots, 14$ | (1) |
| | ELSE | |
| | $SDi = XDi \text{ AND } (\text{NOT } XDi + 1);$ | |
| | $i = 0, 2, \ldots, 14$ | (2) |
| ELSE | | |
| | $SDi = XDi;\ i = 0, 2, \ldots, 14$ | (3) | where OR, AND and NOT are logic operations.

When bit mapped memory 10 is in a negative logic state, the equation (1) is changed to:

$$SDi = XDi \text{ AND } XDi+1,\ i=0, 2, \quad 14$$

and the equation (2) is changed to:

$$SD_i = XD_i \text{ OR } (\text{NOT } XD_{i+1}), i=0, 2, \ldots 14.$$

OPERATION OF THE INVENTION

Figure 5:
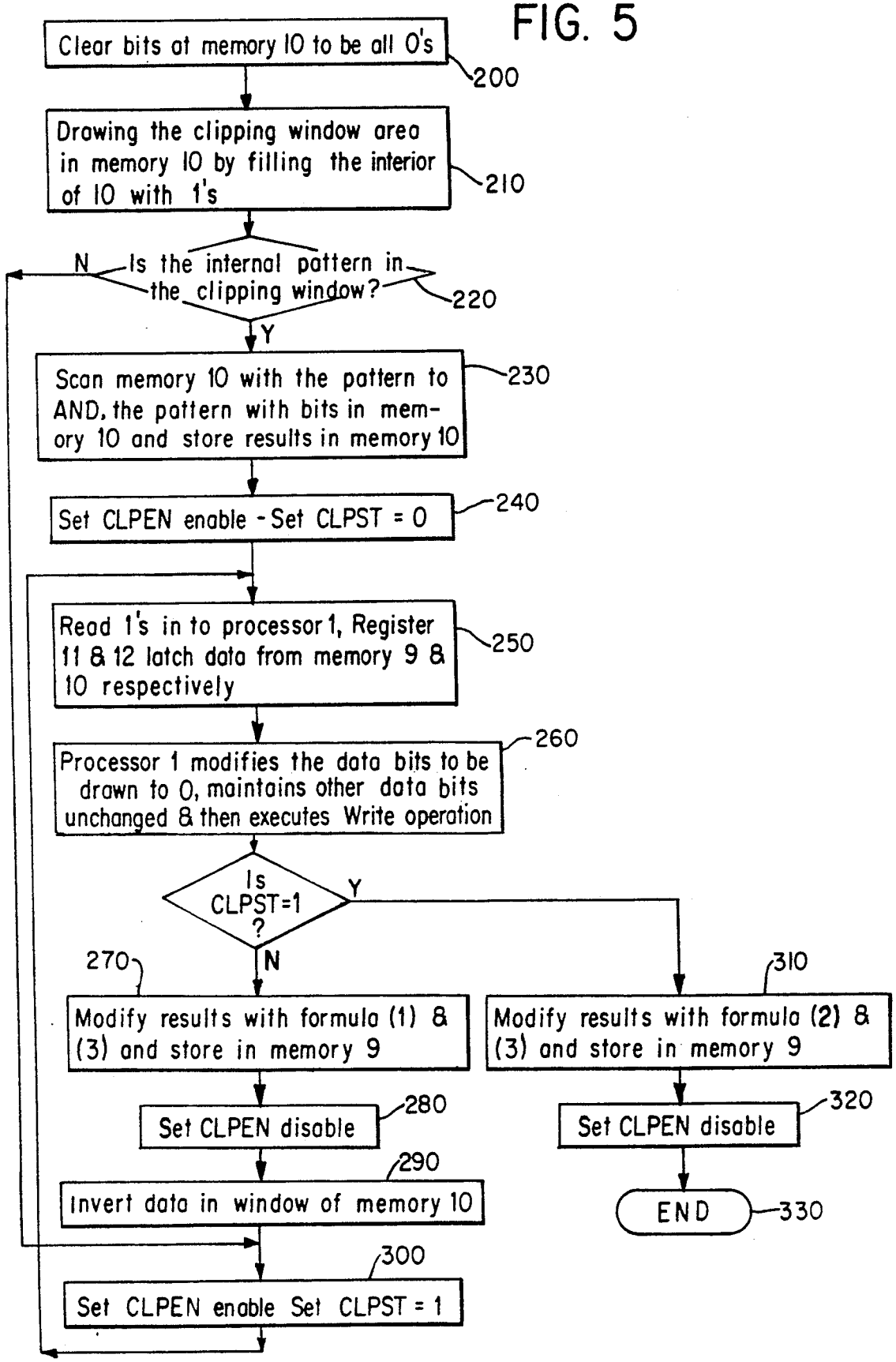
FIG. 5 is a flow diagram of a method in accordance with the invention.

The system of the above disclosed embodiment of the invention operates as follows, with reference to the flow diagram of FIG. 5:

1. The graphic processor 1 clears the bits of bit mapped memory 10 so that all bits have a logic value of 0 (Block 200).

2. Graphic processor 1 draws the clipping window area in bit mapped memory 10 by completely filling the bits corresponding to the interior of the clipping window (Block 210).

3. If the clipping window has no internal patterns the program jumps to step 9 (Block 220).

4. Utilizing the bit-block transfer function of the graphic processor 1, the whole bit mapped memory 10 is scanned by the internal pattern data. In the meantime, an AND logic operation is performed on the internal pattern data and the bit mapped memory 10 so that the internal pattern data fills only the inside of the clipping window (Block 230).

5. Graphic processor 1 activates the CLPEN signal and sets the signal CLPST to 0 (Block 240).

6. Graphic processor 1 draws the graph data into the bit mapped memory 9 by executing a READ-MODIFY-WRITE operation. At the moment of executing the READ operation, the bus controller 4 disables the bidirectional transceiver 3 so that the data in bit mapped memories 9 and 10 cannot be sent to the graphic processor 1. The graphic processor 1 reads every data bit as a 1 because of its connection with pull up resistors 14 on the data bus. The data output from the bit mapped memories 9 and 10 are stored separately in register 11 and register 12 (Block 250). Then the graphic processor 1 modifies the data bits to be drawn to 0, maintains the data not to be drawn unchanged and then executes a WRITE operation (Block 260). When executing a WRITE operation, every data bit, LAD0, LAD2 . . . LA14, output from the graphic processor 1 is modified by clipping controller 13 with formula (1) or (3) according to the polarity of each data bit and written into bit mapped memory 9. A WRITE operation is not executed with respect to bit mapped memory 10 at this time (Block 270).

7. The graphic processor 1 disables the signal CLPEN (Block 280).

8. The graphic processor 1 changes all of the data inside the clipping window in bit mapped memory 10 to reverse logic levels but maintains the data outside the window unchanged (Block 290).

9. The graphic processor 1 activates the CLPEN signal and sets the signal CLPST to 1 (Block 300).

10. The graphic processor 1 draws the graph into the bit-mapped memory 9. The process is almost the same as step 6 but when executing a WRITE operation, each data bit output from the graphic processor 1 is modified by clipping controller 13 with formulae (2) or (3) according to the polarity of each data bit (Block 250, 260, 310).

11. The clipping enable signal, CLPEN is disabled (Block 320).

12. Clipping is terminated (Block 330). As a result, the graphic patterns expected are obtained in the bit mapped memory 9.

Figure 2A:
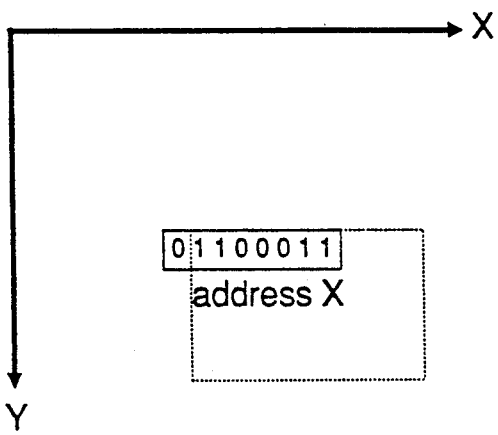
FIGS. 2(a) to 2(i) are schematic representations of the data in the memories at various times during the method of the invention.
Figure 2B:
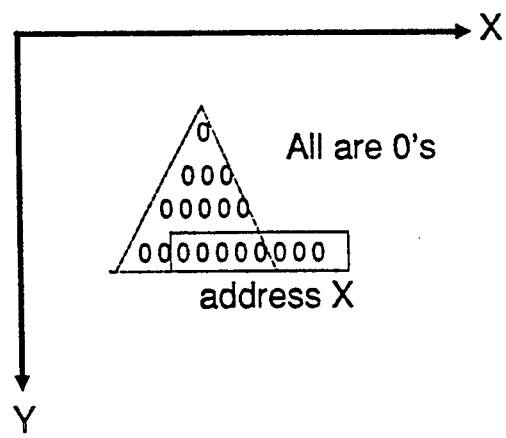
Figure 2C:
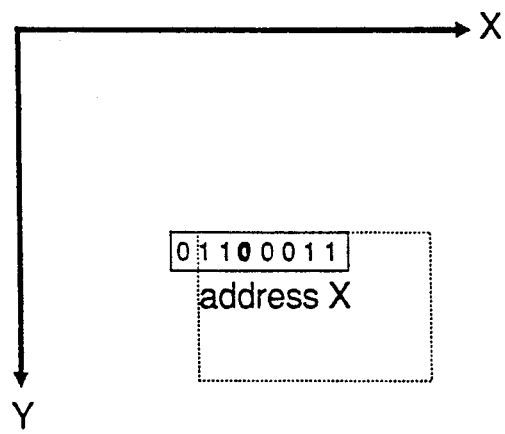
Figure 2D:
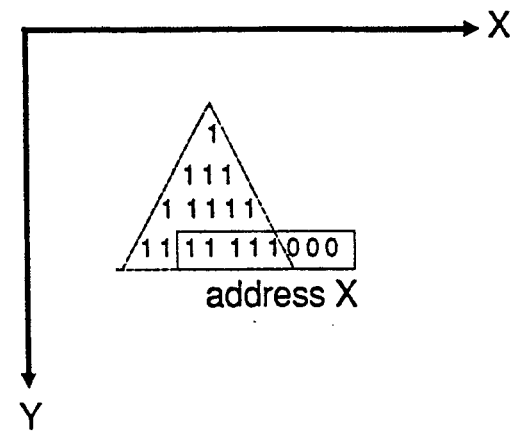
Figure 2E:
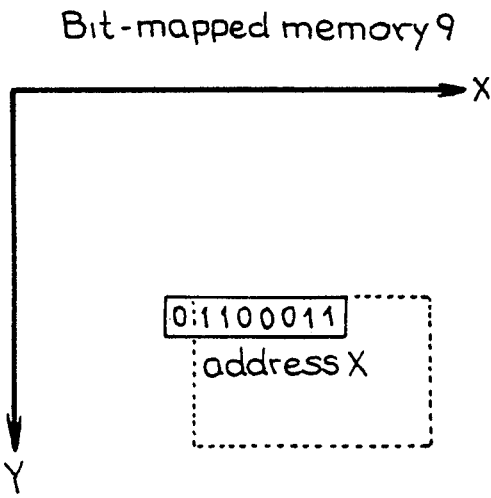
Figure 2F:
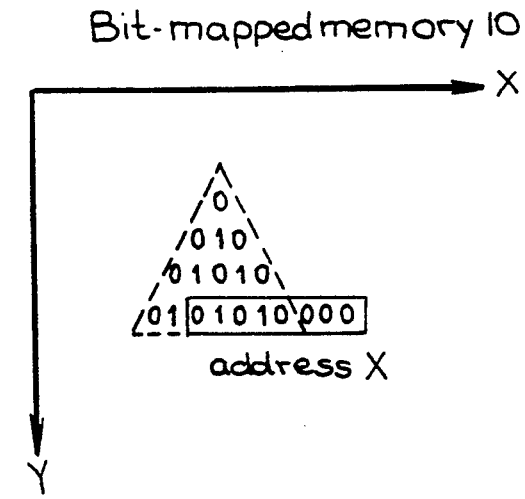

FIGS. 2(a) to 2(i) are an illustration of the contents of the memories, enabling a better understanding of the above embodiment of the invention. To simplify the explanation, only a single address X will be described. FIG. 2(a) and FIG. 2(b) illustrate the results of execution of the above step 1. The content of address X initially stored in bit mapped memory 9 and shown in FIG. 2(a), is 01100011. The rectangular pattern enclosed by dashed lines defines the boundary of the drawing graph. FIG. 2(b) illustrates the content of bit mapped memory 10 wherein all bits inside it are cleared to 0's by the graphic processor. The triangular shape enclosed by dashed lines defines the clipping window and the inside of the window are then filled with 1's as described in the above step 2 and FIG. 2(c) and FIG. 2(d) illustrate the results of execution. The content of FIG. 2(c) is the same as of FIG. 2(a). The bits inside the window shown in FIG. 2(d) are 1's and the other bits outside the window in memory 10 remain 0's. Part of the address X is inside the clipping window and another part is outside the window, and its value in bit-mapped memory 10 is 11111000. FIG. 2(e) and FIG. 2(f) illustrate the results of execution of the above steps 3 and 4. The inside of the window includes a pattern, one part of which has the value 1 and another part of which has the value 0 as shown in FIG. 2(f). The value of address X in memory 10 is 01010000. The content of the memory 9 remains unchanged. After step 5 is executed, CLPEN is enabled and CLPST is set to 0. Step 6 is then executed. When the graphic processor 1 executes a READ operation to address X, the value 01100011 is output from bit mapped memory 9 and stored in register 11, i.e., XD0=0, XD2=XD4=1, XD6=XD8=XD10=0, XD12=XD14=1, and the value 01010000 is output from bit mapped memory 10 and stored in register 12 i.e., XD1=0, XD3=1, XD5=0, XD7=1, XD9=XD11=XD13=XD15=0. Since the bidirectional transceiver 3 is disabled, the value of LAD0, 1, 2, . . . 15, that graphic processor 1 reads is 1111111111111111, due to the use of the pull up resistors, and this value is soon modified to 1100000000000000. When the graphic processor 1 executes a WRITE operation, the value 1100000000000000 will also appear on the address/data buses LAD0, 1, 2, . . . 15. The odd number bits are not considered at this time since the bit mapped memory 10 is not controlled by the WRITE operation. Therefore, it is only necessary to input the even number bits valued 10000000 into the clipping controller 13 for disposition. The disposition method thus produces the following results:

| LAD0, 2, 4, . . . , 14 = 1 | 0000000 |
|---|---|
| XD0, 2, 4, . . . , 14 = 0 | 1100011 |
| XD1, 3, 5, . . . , 15 = 0 | 1010000 |
| The execution equation is (3) | (1) |

Figure 2G:
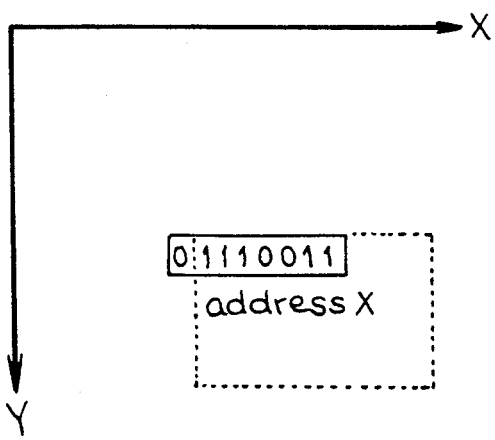

The execution equation is (3)|(1) The result is SD0, 2, . . . , 14=01110011, as shown in FIG. 2(g).

Figure 2H:
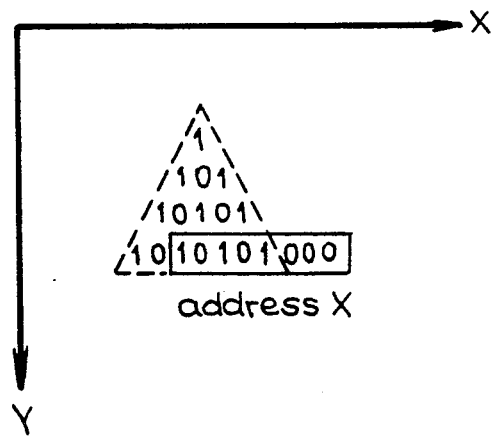

FIG. 2(h) illustrates the results of execution of steps 7 and 8, wherein the data inside the clipping window is reversed and the content of address X is modified to 10101000. Upon execution of step 9, the signal CLPEN is enabled, CLPST is set to 1, and step 10 is then executed. When the graphic processor 1 executes a READ operation to address X, the value 01110011 output from the bit mapped memory 9 is stored in register 11 i.e., XD0=0, XD2=XD4=XD6=1, XD8=XD10=0, XD12=XD14=1 and the value 10101000 is output from bit mapped memory 10 and stored in register 12, i.e., XD1=1, XD3=0, XD5=1, XD7=0, XD9=1, XD11=XD13=XD15=0. At the same time, the value of LAD0, 1, 2, ... 15, that graphic processor 1 reads is still 1111111111111111, which is modified to 1100000000000000, and then a WRITE operation is executed. The disposition method of clipping controller 13 is as follows:

| | |
|---|---|
| LAD0, 2, 4, ..., 14 = 1 | 0000000 |
| XD0, 2, 4, ..., 14 = 0 | 1110011 |
| XD1, 3, 5, ..., 15 = 1 | 0101000 |
| The execution equation is (3) | (2) |

Figure 2I:
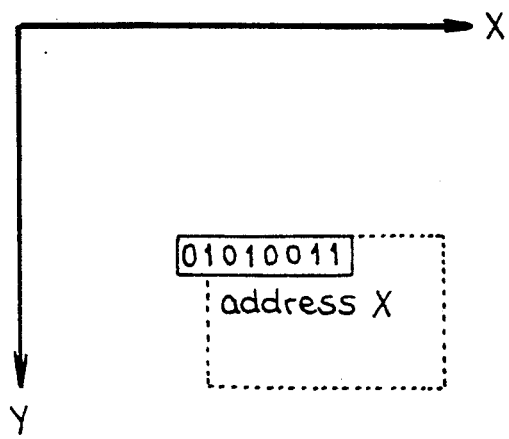

The result is SD0, 2, ..., 14=01010011, as shown in FIG. 2(i). This means that the drawing graph can only be drawn in the clipping window and can also be mixed with the patterns inside the window, while the data outside the window retains its original value. Finally, steps 11 and 12 are executed to end the process of window clipping disposition.

Figures 3A, 3B, 3C:
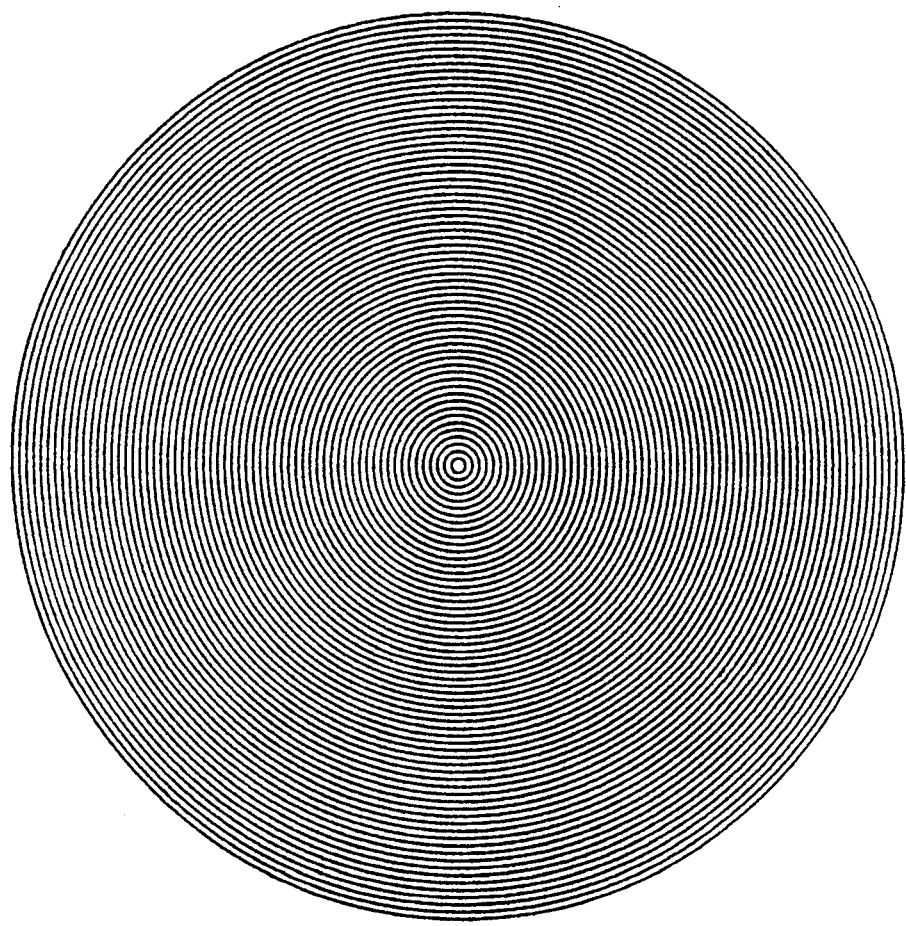
FIGS. 3(a) to 3(c) are schematic representations of one example of the data and window, and the results of the use of the method of the invention.

FIGS. 3(a) to 3(c) and FIGS. 4(a) to 4(c) illustrate the final result of the invention. In FIG. 3(a), the outlines of the four characters "ERSO" are used as an arbitrarily shaped clipping window and there are no internal patterns. FIG. 3(b) is a drawing graph intended to be drawn inside of "ERSO". FIG. 3(c) is the final result in accordance with the invention.

Figures 4A, 4B, 4C:
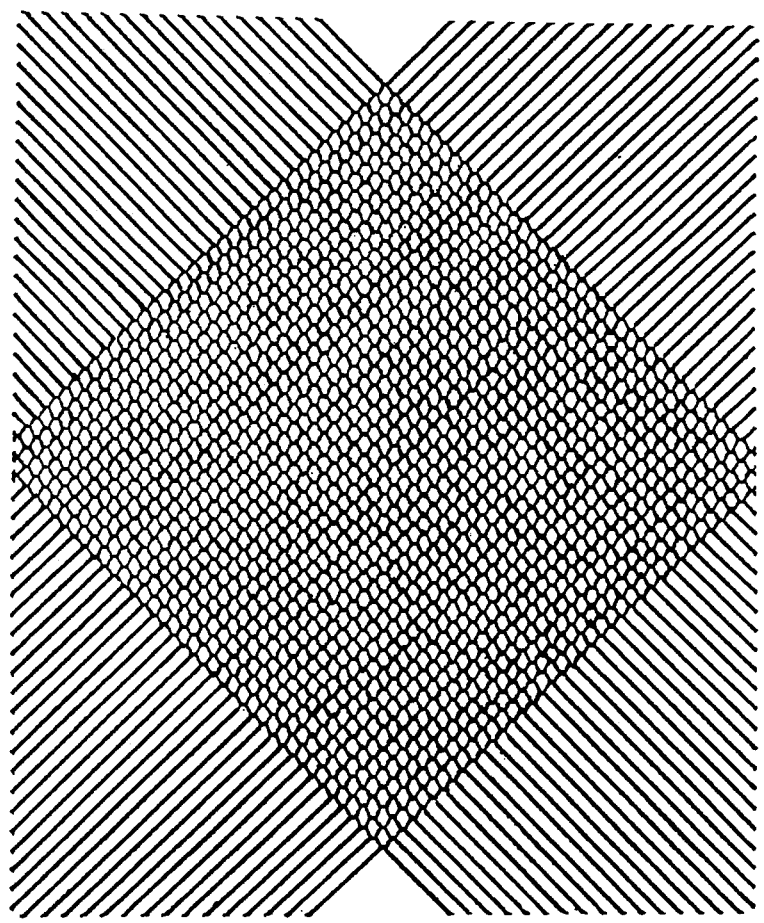
FIGS. 4(a) to 4(c) are schematic representations of another example of the data and window, and the results of the use of the method of the invention.

In FIG. 4(a), the outline of "ERSO" is also used as an arbitrarily shaped clipping window with patterns inside, parts of which are light and other parts of which are dark. FIG. 4(b) is the drawing graph and FIG. 4(c) illustrates the final result. Inside the clipping window, the resulting graph contains the combination of the patterns inside the clipping window and the drawing graph, and the data outside the clipping window remains unchanged.

In a modified method in accordance with the invention, as illustrated in FIGS. 6(a) to 6(e), step 4 of the method discussed above is omitted, and step 8 of the method discussed above (now step 7 in view of the omission of step 4) is modified as follows:

7. Utilizing the bit-block transfer function of the graphic processor 1, the whole bit mapped memory 10 is scanned by the reversed pattern data. In the meantime, an AND logic operation is performed on the reversed pattern data and the bit mapped memory 10 so that the reversed pattern data fills only the inside of the clipping window.

The remainder of the steps remain the same.

Figure 6A:
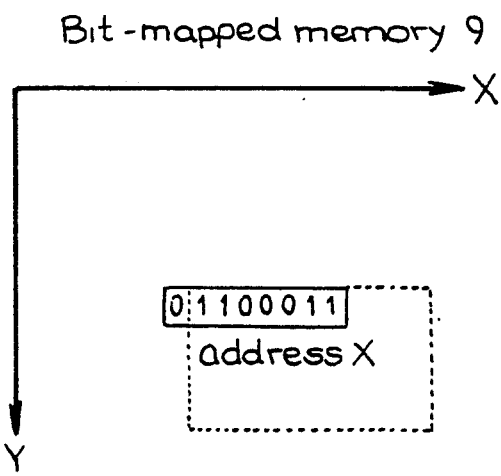
FIGS. 6(a) to 6(e) are schematic representations of the data in the memories at various times in a variation of the method of the invention.
Figure 6B:
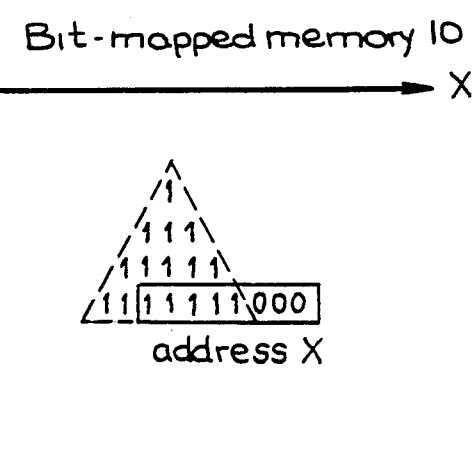
Figure 6C:
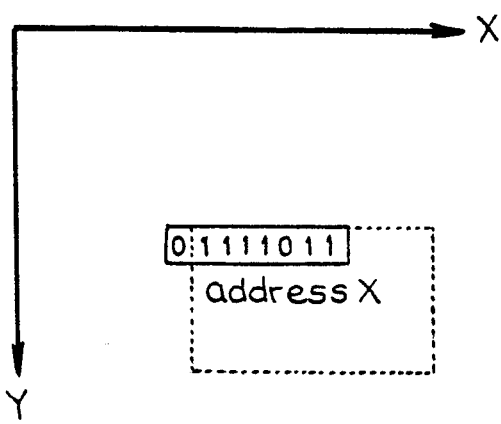

FIGS. 6(a) to 6(e) illustrates the contents of the memories in this modification of the method of the invention. Thus, FIGS. 6(a) and 6(b) illustrate the results of execution of steps 1 through 3 as discussed above. FIG. 6(c) shows the result SD0, 2, ..., 14=01111011 after the following logical operation:

| | |
|---|---|
| LAD0, 2, 4, ..., 14 = 1 | 0000000 |
| XD0, 2, 4, ..., 14 = 0 | 1100011 |
| XD1, 3, 5, ..., 15 = 1 | 1111000 |
| The execution equation is (3) | (1) |

Figure 6D:
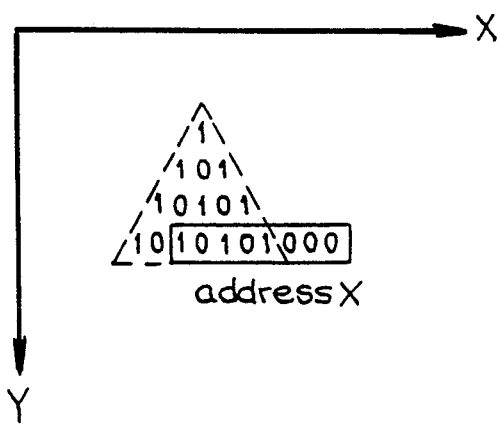
Figure 6E:
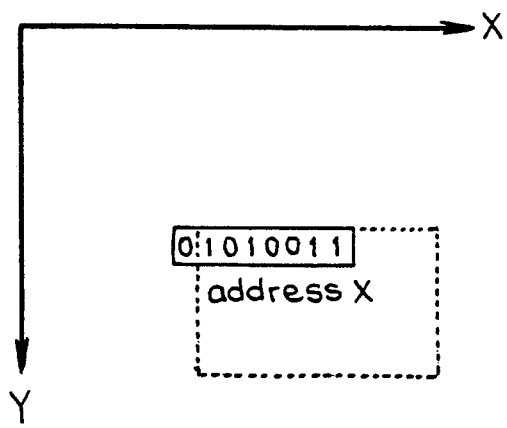

FIG. 6(d) illustrates the results of steps 6 and 7 (corresponding to former steps 7 and 8), wherein the data inside the window includes the reversed patterns, opposite logic levels of the original patterns. FIG. 6(e) is the final result,. SD0, 2, ..., 14=01010011, which is produced by the following logic operations:

| | |
|---|---|
| LAD0, 2, 4, ..., 14 = 1 | 0000000 |
| XD0, 2, 4, ..., 14 = 0 | 1111011 |
| XD1, 3, 5, ..., 15 = 1 | 0101000 |
| The execution equation is (3) | (2) |

The results are the same as in the previously described method, but the new method is simpler and faster than the previous method.

The invention thus provides an efficient window clipping method and apparatus for solving problems involving arbitrarily shaped clipping windows, patterns and halftone, etc.. Use of intersection calculations of the drawing graph and the boundary of the clipping window are completely obviated, and the speed of operation is thus enhanced.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. A window clipping method, comprising the steps of:

employing at least one arbitrarily shaped clipping window to clip points, lines and character strings of a graphic pattern in a graphic processing system;

writing clipping window data indicative of the arbitrarily shaped clipping window in a first bit-mapped memory and filling bits thereof to distinguish the interior and exterior of the clipping window, each bit of said clipping window data corresponding to a point on a display;

writing initial graphic data indicative of said graphic pattern in a second bit-mapped memory, each bit of said initial graphic data corresponding to a point on said display;

latching said clipping window data and initial graphic data in first and second registers, respectively;

determining binary values of drawing data bits with a graphic processor by executing a READ-MODIFY-WRITE operation, the drawing data bits being separate from said initial graphic data stored in said second bit-mapped memory;

performing logic operations in response to said drawing data bits with a clipping controller on the corresponding bits of each point on said display from said first and second registers respectively, to determine result graphic data that is indicative of a result of said graphic pattern as clipped by said clipping window; and writing said result graphic data into said second bit-mapped memory.

2. A graphic processing system, comprising:

an arbitrarily shaped clipping window for clipping a graphic pattern on a display;

a first bit-mapped memory for storing clipping window data indicative of said clipping window at addresses corresponding to a coordinate plane of said display;

a second bit-mapped memory for storing graphic data indicative of a graphic pattern at said addresses;

a graphic processor with a plurality of data buses connected thereto and for executing a Read-Modify-Write operation to write said clipping window data and said graphic data into said first and second bit-mapped memories, respectively, and for generating drawing data on said data buses corresponding to said window data and graphic data to determine if each bit of said graphic data is to be drawn on said display;

means for generating a clipping enable signal and a clipping status signal;

bus control means responsive to said clipping enable signal for controlling an active-low output-enable pin on a bidirectional transceiver connected to said bit-mapped memories in order to control data communication between said bit-mapped memories and said graphic processor, said bidirectional transceiver becoming disabled in response to said clipping enable signal being active so that said bus control means suspends said data communication between said bit-mapped memories and said graphic processor;

first and second registers for latching said data output from said first and second bit-mapped memories, respectively; and a clipping controller for receiving sadi graphic data output from said second register as initial data and for receiving said clipping window data output from said first register, said clipping controller being responsive to said clipping enable signal and said clipping status signal and said drawing data for selectively performing logic operations on said clipping window data and being responsive to said initial data for determining result graphic data, said result graphic data being indicative of a result graphic pattern as clipped by said clipping window and written into said second bit-mapped memory by said graphic processor.

3. The graphic processing system according to claim 2, wherein said second bit-mapped memory has a negative logic mode, said system further comprising a plurality of pull up resistors connected to said data buses so that every first input data bit on said data buses which said graphic processor reads in is 1 when said data communication between said bit-mapped memory and the processor is suspended, each said first input data bit corresponding to one bit of said window data and graphic data, said graphic processing further comprising means for changing said first input data bits corresponding to said graphic data bits and window data bits to be drawn to 0 for determining said drawing data.

4. The graphic processing system according to claim 2, wherein said second bit-mapped memory has a positive logic mode, said system further comprising a plurality of pull down resistors connected to said data buses so that every first input data bit on said data buses which said graphic processor reads in is 0 when said data communication between said bit-mapped memory and the processor is suspended, each said first input data bit corresponding to one bit of said window data and graphic data, said graphic processor further comprising means for changing said first input data bits corresponding to said graphic data bits and window data bits to be drawn to 1 for determining said drawing data.

5. The graphic processing system according to claim 2, wherein said first bit-mapped memory has a positive logic mode and said clipping controller is for receiving bits of said drawing data indicative of said bits of said graphic data to be drawn on said display, said clipping controller being for selectively performing said logic operations which include performing an OR operation of corresponding data bits from said first and second registers when the clipping status signal is 0 and for inverting every data bit in said first register when said clipping status signal is 1 and then for performing an AND operation with the corresponding data bit in said second register.

6. The graphic processing system according to claim 2 wherein said first bit-mapped memory has a negative logic mode and said clipping controller receives bits of said drawing data indicative of said bits of said graphic data to be drawn on said display, said clipping controller being for selectively performing said logic operations which include performing an AND operation of corresponding data bits from said first and second registers when the clipping status signal is 0 and for inverting every data bit in said first register, and then for performing an OR operation with the corresponding data bit in said second register.

7. A window clipping method, comprising the steps of:

employing at least one arbitrarily shaped clipping window with internal patterns inside to clip points, lines and character strings of a graphic pattern in a graphic processing system;

writing initial data indicative of said arbitrarily shaped clipping window in a first bit-mapped memory, filling the bits thereof to distinguish the interior and exterior of the clipping window, and then performing an AND logic operation on said initial data and internal pattern data of said internal pattern to determine clipping window data in said first bit-mapped memory;

writing initial graphic data indicative of said graphic pattern in a second bit-mapped memory;

latching said clipping window data and initial graphic data in first and second registers, respectively;

determining binary values of drawing data bits with a graphic processor by executing a READ-MODIFY-WRITE operation, the drawing data bits being separate from said initial graphic data stored in said second bit-mapped memory;

performing logic operations with a clipping controller on said clipping window data and initial graphic data from said first and second registers, to determine modified graphic data and writing said modified graphic data into said second bit-mapped memory;

complementing said clipping window data stored in said first bit-mapped memory;

executing logic operations with said clipping controller on said modified graphic data and the complemented clipping window data from said first and second bit-mapped memories, respectively, to determine result graphic data that is indicative of a result of said graphic pattern as clipped by said clipping window with internal pattern inside; and writing said result graphic data into said second bit-mapped memory.

* * * * *